(12) United States Patent
Chang et al.

(10) Patent No.: US 8,786,642 B2
(45) Date of Patent: Jul. 22, 2014

(54) DIGITAL HYBRID COCKPIT CONTROL PANEL SYSTEM WITH INTEGRATED PANEL MODULES AND COORDINATED DIGITAL CHROMATICITY CONTROL

(75) Inventors: Jie Jay Chang, Newbury Park, CA (US); Vanacan Tatavoosian, Mission Viejo, CA (US)

(73) Assignee: Eaton Corporation, Cleveland, OH (US)

( * ) Notice: Subject to any disclaimer, the term of this patent is extended or adjusted under 35 U.S.C. 154(b) by 219 days.

(21) Appl. No.: 13/125,826

(22) PCT Filed: Nov. 24, 2010

(86) PCT No.: PCT/US2010/058047
§ 371 (c)(1),
(2), (4) Date: Apr. 25, 2011

(87) PCT Pub. No.: WO2011/066420
PCT Pub. Date: Jun. 3, 2011

(65) Prior Publication Data
US 2012/0223974 A1      Sep. 6, 2012

Related U.S. Application Data

(60) Provisional application No. 61/264,948, filed on Nov. 30, 2009.

(51) Int. Cl.
*G09G 5/10* (2006.01)
(52) U.S. Cl.
USPC .......................................... 345/690; 362/471
(58) Field of Classification Search
USPC ............... 345/77, 89, 690; 362/482, 487–489
See application file for complete search history.

(56) References Cited

U.S. PATENT DOCUMENTS

| | | | | |
|---|---|---|---|---|
| 5,428,265 A | * | 6/1995 | Booth et al. | 315/158 |
| 5,583,484 A | * | 12/1996 | Asano | 340/461 |
| 5,975,728 A | * | 11/1999 | Weyer | 362/489 |
| 6,575,583 B2 | * | 6/2003 | Suzuki et al. | 362/23 |
| 7,002,546 B1 | | 2/2006 | Stuppi et al. | |
| 7,438,451 B2 | * | 10/2008 | Daniel | 362/489 |

(Continued)

FOREIGN PATENT DOCUMENTS

| | | |
|---|---|---|
| DE | 10008888 A1 | 9/2001 |
| EP | 0858924 A1 | 8/1998 |
| WO | 0037904 A1 | 6/2000 |

OTHER PUBLICATIONS

European Patent Office; International Search Report and Written Opinion issued in counterpart PCT application No. PCT/US2010/058047. Date of Mailing: Mar. 11, 2011.

*Primary Examiner* — Rodney Amadiz
(74) *Attorney, Agent, or Firm* — Dykema Gossett PLLC (57) ABSTRACT

The system includes a digital system architecture including digital chromaticity control. Such control may include color balance, luminance, and color compensation and/or harmonization of multiple integrated modules of display or illuminated panels. Embodiments include a system topology with an integrated modular design for multiple display or illuminated control panels, which can reduce the system weight, wiring complexity, and development expense. In embodiments, a digital chromaticity control includes in-module and cross-module control for balance and harmonization of multiple panels and modules, incorporating integrated digital signal processors and digital communications for internal and external networking.

28 Claims, 8 Drawing Sheets

(56) References Cited

U.S. PATENT DOCUMENTS

| | | | |
|---|---|---|---|
| 7,639,154 B2 * | 12/2009 | Bourret et al. | 340/815.4 |
| 7,872,589 B2 * | 1/2011 | Romig et al. | 340/815.4 |
| 2007/0159005 A1 | 7/2007 | Bourret et al. | |
| 2010/0164855 A1 * | 7/2010 | Su et al. | 345/102 |
| 2010/0204854 A1 | 8/2010 | Chang et al. | |
| 2011/0050738 A1 * | 3/2011 | Fujioka et al. | 345/690 |

* cited by examiner

DIGITAL HYBRID COCKPIT CONTROL PANEL SYSTEM WITH INTEGRATED PANEL MODULES AND COORDINATED DIGITAL CHROMATICITY CONTROL

CROSS-REFERENCE TO RELATED APPLICATION

This application is a national stage filing based upon International PCT Application No. PCT/US2010/058047, with an international filing date of Nov. 24, 2010, which claims the benefit of the filing date of U.S. Provisional Patent Application Ser. No. 61/264,948, filed Nov. 30, 2009, the entire disclosures of which are incorporated herein by reference.

BACKGROUND

1. Technical Field

The present disclosure relates generally to cockpit control panel (CCP) systems, including hybrid integrated modular design and configurations for coordinated digital chromaticity control of multiple CCP panels across multiple zones in cockpit.

2. Description of the Related Art

Present industrial or aircraft CCP systems are not designed to have functional capability for aviation color balance and/or color compensation by modulating lighting spectrum in a cockpit control panel system with multiple illuminated panels. At the same time, it is desirable for aircraft, particularly large aircraft, to provide color harmonization with operational background change and/or environmental lighting change capabilities. The spectrum and luminance variations of the light sources (e.g., lighting devices in an illuminated light plate), often due to changes in device characteristics (or parameter tolerances) and production process variations, often challenge high performance panels to meet the specifications because of tight system requirements for specific light spectrum locations and balances of different panels as defined by a corresponding chromaticity specification.

Figure 1:
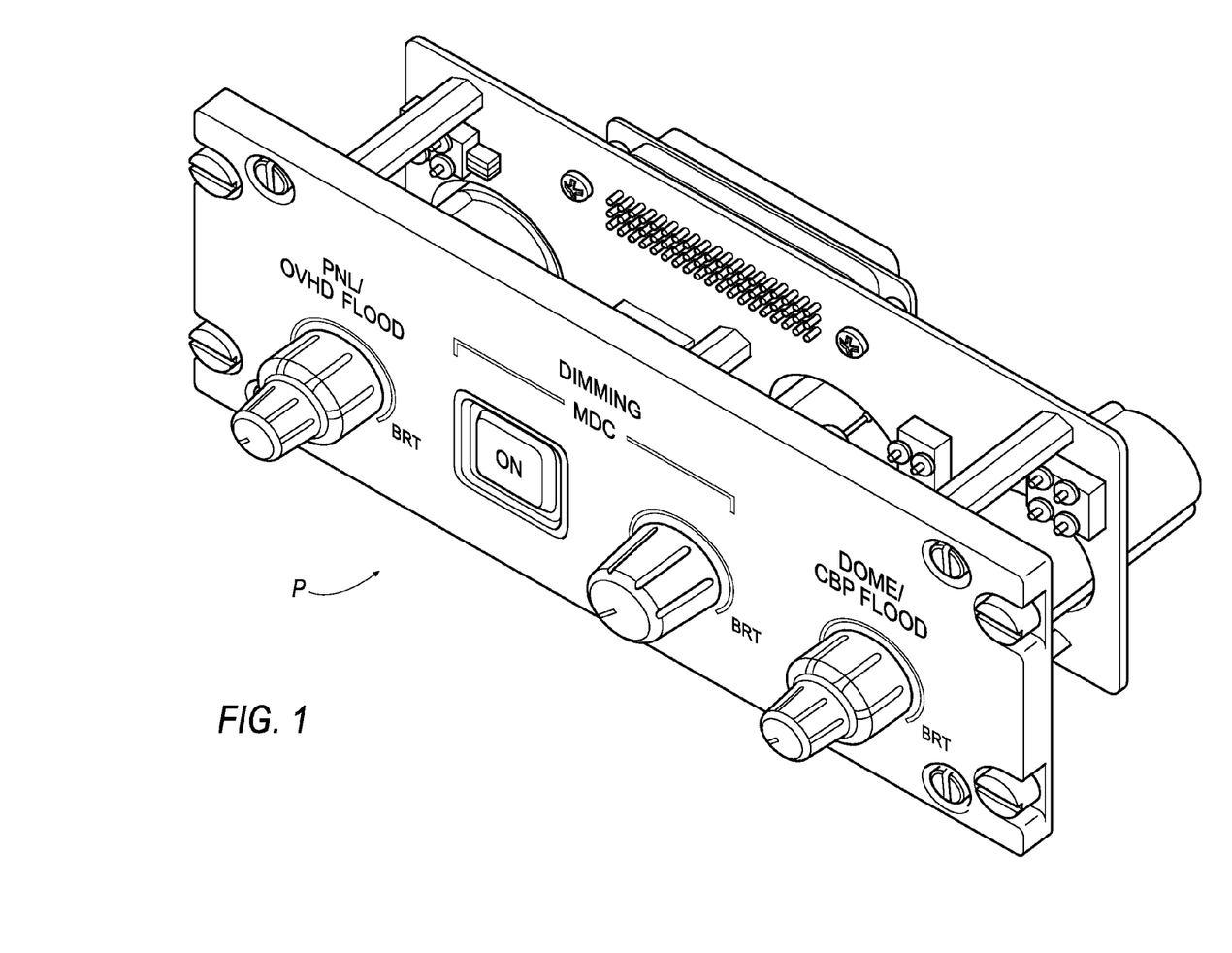
FIG. 1 is an isometric representation of a conventional CCP panel.

Conventional CCP system are based an assembly of many individual small panels, provided in parallel, with each performing as an individual "cell panel" for specific functions of user interface and control. An example of a conventional panel is shown in FIG. 1. Such a conventional panel includes analog circuits in the backside configured to interface with pilot operating devices in the front panel including, for example, on-off switches with multiple poles and voltage reference POTs with multiple wipers. An individual light plate is generally employed to provide a given level of illumination per setup point of a potential meter device in a specific control mode. It also employs analog output cables of electric copper wire to interface with individual (or a group of) loading devices under control over a distance. Each "cell panel" operates independently based on pre-designed control functions. For instance, an air management subsystem can include and employ multiple small individual panels, such as panels for air condition, bleed air, cabin pressure, etc.

Some drawbacks associated with conventional systems include: (1) the need for a large number of interface connectors and electric cupper wires to carry multiple analog signals between the CCPs and corresponding load devices under control; (2) the physical isolation of "cell panels," which can cut off signal paths and make inefficient utilization of the backside print circuit board (PCB), which can in turn make it difficult for conventional small panels, in adjacent physical locations, to incorporate and share a digital signal processor (DSP) or microprocessor (MPU) for computational power and digital processing in a conventional design; (3) higher cost, excessive time and manpower for airworthiness certification associated with the introduction of an advanced digital system that is based on DSP/MPU circuits controlling a larger number of individual small CCP panels. Some of the aforementioned drawbacks can also lead to increased weight, wiring complexity and more expensive design. Moreover, conventional systems commonly have no capability for lighting or dimming adjustment, color modulation, color compensation, color balance of multiple illuminated panels, or harmonization with operational or environmental lighting background changes.

Among other things, the present disclosure attempts to address and/or overcome such potential drawbacks.

SUMMARY

Aspects of the present disclosure include an integrated modular approach for CCP panels. Embodiments of the approach can be employed to optimize aspects or features of the system. Such an approach can provide, inter alia, a design methodology with more efficient architecture, segregation and grouping for a digital or hybrid CCP system with multiple cockpit displays or illuminated control panels. The technology components in such a hardware modular architecture may include: integrated digital panel modules (IDPM), integrated analog panel modules (IAPM), and integrated hybrid-digital panel modules (IHDPM)—i.e., a combination of digital and analog interfaced CCP control panels.

Embodiments of the invention can reduce system wiring complexity, weight, and cost. Further, a digital system architecture and approach may be employed for color balance, compensation, and harmonization of multiple integrated modules of display or illuminated panels.

BRIEF DESCRIPTION OF THE DRAWINGS

The present invention will now be described, by way of example, with reference to the accompanying drawings, wherein like reference numerals identify like components in the several figures, in which.

DETAILED DESCRIPTION

Figure 2:
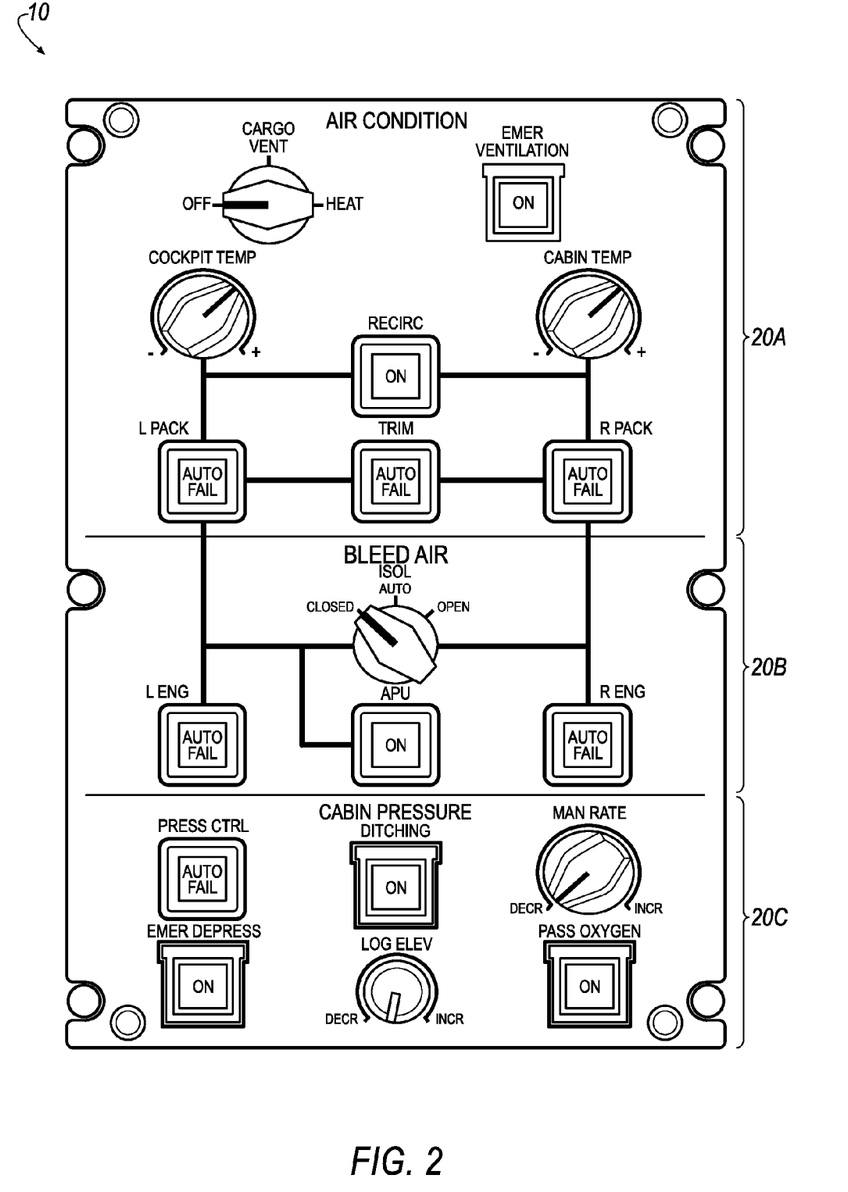
FIG. 2 is an illustration of exemplary integrated modular CCP panel LRU according to an embodiment of the present invention.

Integrated and hybrid CCP modular panels in accordance with the teachings of the present disclosure can provide a novel configuration with more efficient architecture, segregation and grouping for digital or hybrid systems with multiple cockpit displays and/or illuminated control panels. The term "cockpit" can be used to refer to cockpits employed in vehicles or other command and control structures, including, without limitation, aerospace applications. An illustration of exemplary embodiment of an integrated modular CCP panel 10 is shown in FIG. 2. As generally illustrated, the integrated modular CCP panel 10 may be configured for a system (e.g., an air management system), and may integrate a plurality of smaller, individual panels—e.g., an Air Condition panel 20A, a Bleed Air panel 20B, and Cabin Pressure panel 20C. The individual panels (e.g., 20A-20C) may collectively comprise a single module, and may be considered a lowest replaceable unit (LRU).

Embodiments of hardware architecture for integrated CCP modular panels are generally illustrated in FIGS. 2, 3A, 3B, and 4. Integrated CCP modular panels may include:

(a) Integrated digital panel modules (IDPM)—Embodiments of IDPMs may include multiple integrated control panels configured to receive discrete or analog inputs from operating devices associated with one or more front panels, processes them in an embedded circuit (e.g., a DSP circuit), and provides control outputs, e.g., via digital communication buses over a distance. IDPMs can reduce system wiring, weight and volume, such as may be contributed by conventional copper wires. The integrated capability of digital communication may include ARINC 668/AFDX, ARINC 825, or various alternatives.

(b) Integrated analog panel modules (IAPM)—Embodiments of IAPMs may include multiple integrated control panels configured to receive discrete or analog inputs from operating devices associated with one or more front panels, and record or register the inputs in embedded circuits—i.e., DSP or MPU—for example, for status monitoring and/or feedback purposes. If desired, such IAPMs may provide control outputs, for example, via conventional electrical wire cables or other non-digital interface technologies for safety critical or close-by load system devices. While the module may provide control outputs via conventional interface cables or other non-digital interface technologies for safety critical or close-by load system devices, white cross-module data exchanges may be made for coordinated control via digital serial communication buses, including, without limitation, ARINC 668/AFDX, ARINC 825, or other known alternatives that may be integrated with the module.

(c) Integrated hybrid-digital panel modules (IHDPM)—Embodiments of IHDPMs may include combinations of digital and analog interfaced CCP control panels.

Figure 3A:
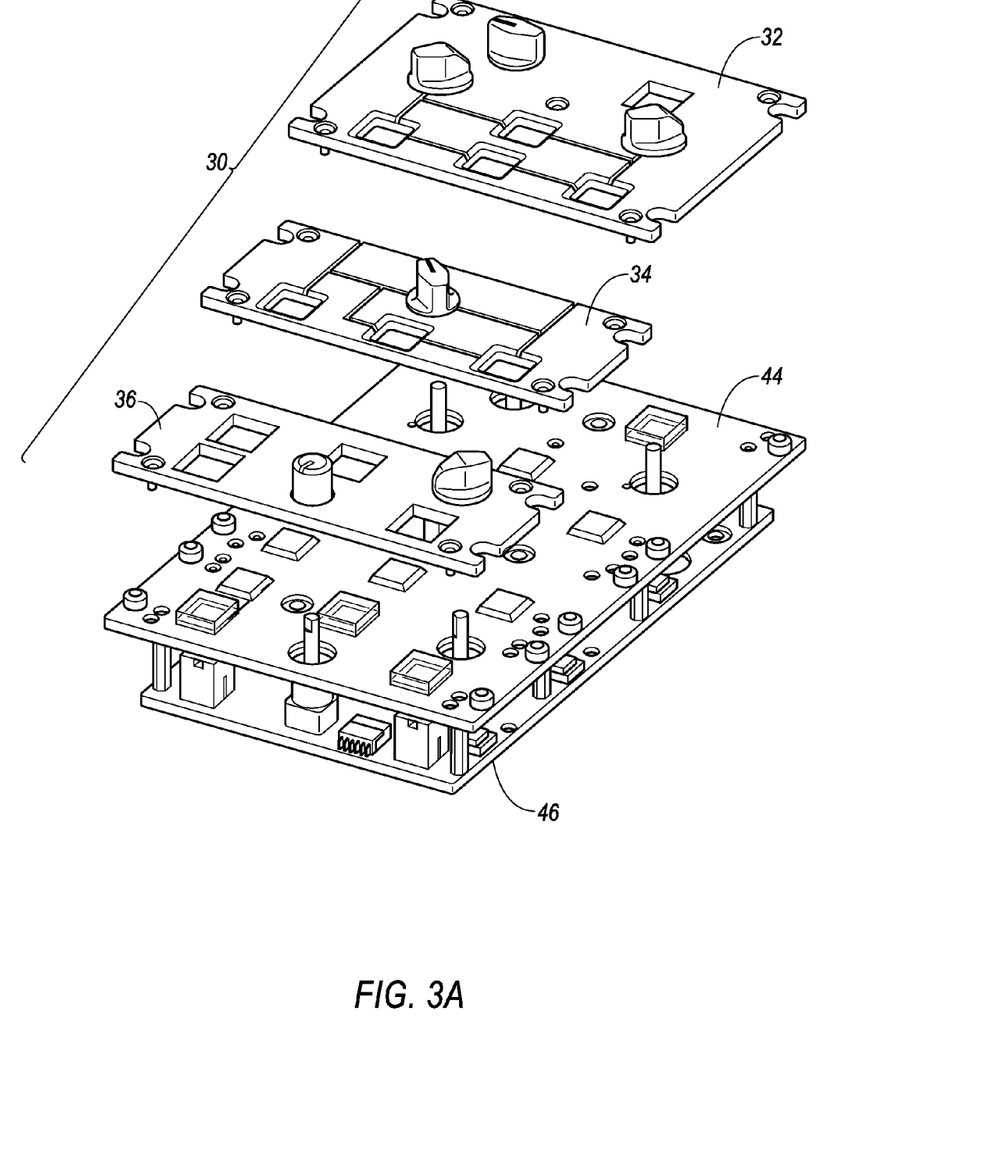
FIGS. 3a and 3b generally depict exploded isometric views of integrated modular CCP panels with split front face plates and integrated front plates, respectively.
Figure 3B:
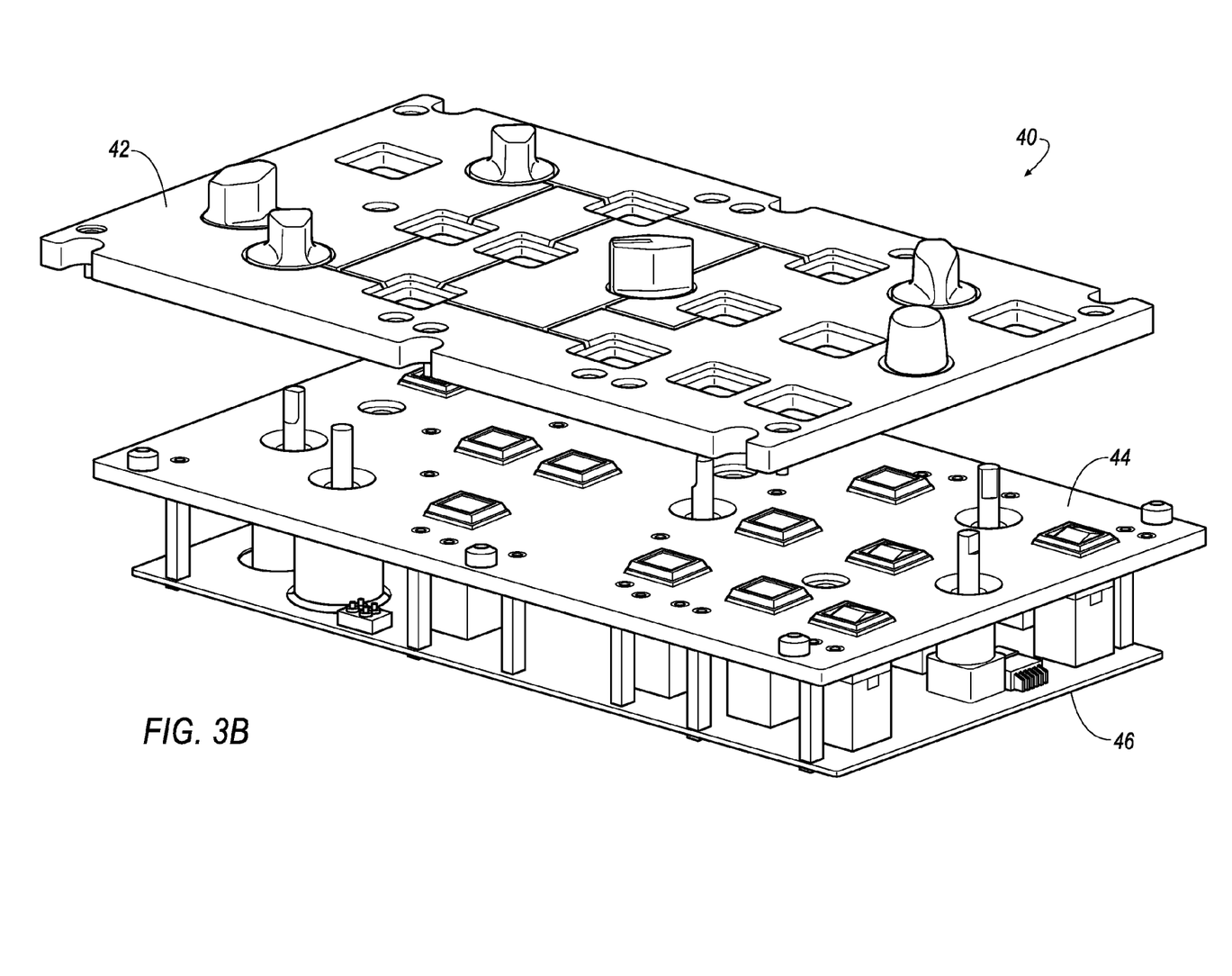

FIGS. 3A and 3B further illustrate breakdown architectures of integrated modular CCP panel (IMCCP) units according to an embodiments of the present invention. An IMCCP generally includes three components:

(1) a backside printed circuit board (PCB or PCBs) 46 of electronics, including DSP/MPU and a digital communication circuit;

(2) a panel face (front) plate and light plate assemblies for illuminated control panels interfacing with a user/pilot, each generally comprising an independently removable part for convenient repair or replacement; and (3) an integrated plate 44 (e.g., an aluminum plate), physically provided between, or in connection with, components (1) and (2); the integrated plate 44 can be configured to provide mechanical and/or mounting support(s) for the module.

FIGS. 3A generally depicts an embodiment of an integrated modular CCP panel 30 with split front face plates 32, 34, 36, while FIG. 3B generally depicts an embodiment of an integrated modular CCP panel 40 with integrated front plates 42. With respect to FIGS. 3A and 3B, it is noted that, if desired, the IMCCP may have a single integrated assembly with a faceplate and light plate.

Figure 4:
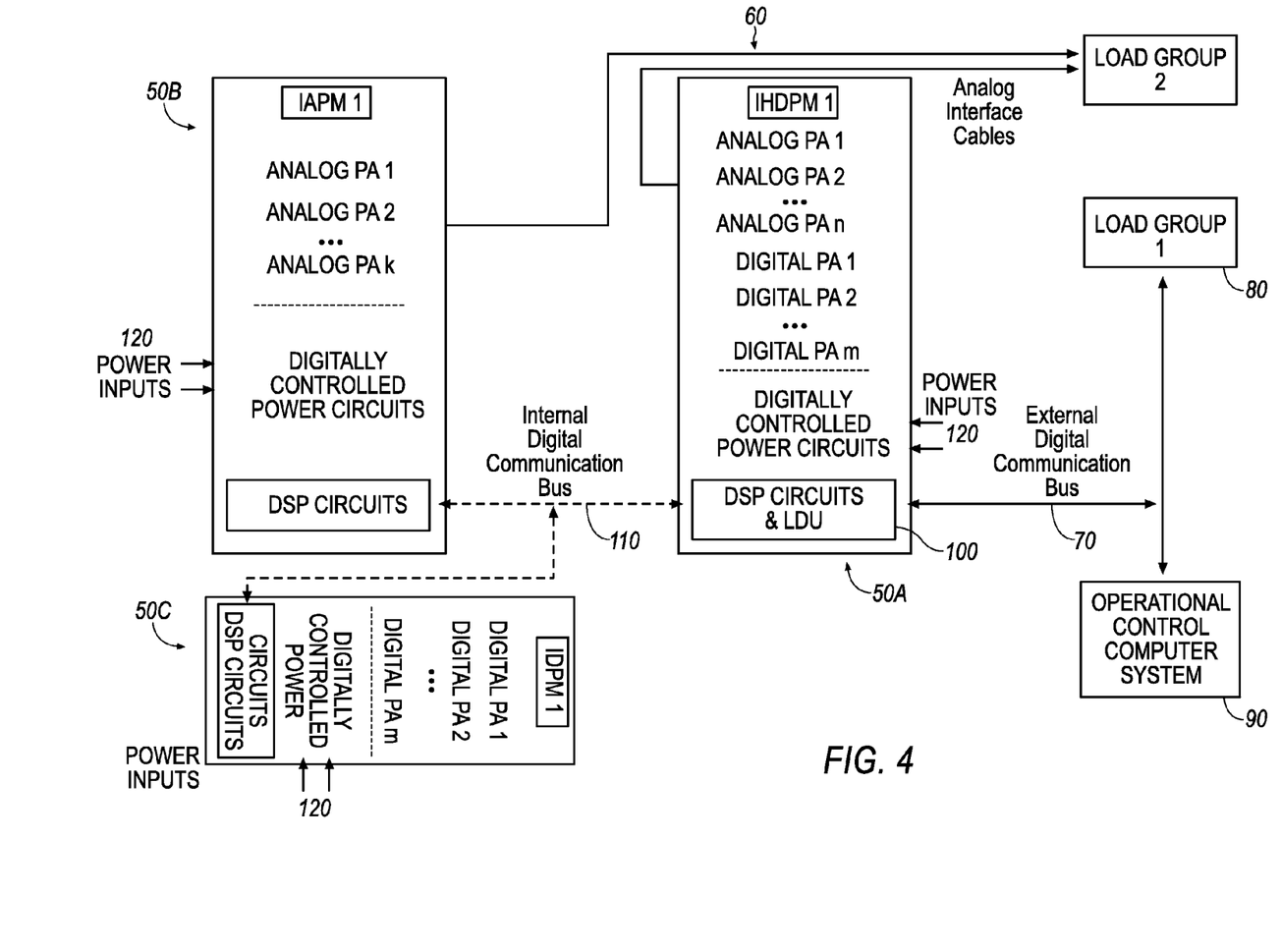
FIG. 4 generally illustrates three exemplary embodiments of integrated controlled panel modules in a hybrid CCP system including hybrid interface technologies.

In an embodiment, a module may include a local/individual dimming control panel (or similar dimming control functions) that permit a user (e.g., pilot) to set dimming control references. Such an arrangement may be provided in each of several cockpit zones, such as, for example, overhead, pedestal, and/or instrument zones. In embodiments, voltage reference dimming control signal(s) that are set may be digitized first by an integrated A/D converter circuit (e.g., 12 bits, less than 10 µsec of conversion time) with multiple channels, and then may be sent to (and stored by) a corresponding DSP register. The digitized dimming control signal(s) may then be sent to various IMCCP modules via an internal communication bus—which may, for example and without limitation, be provided and interconnected as shown in FIG. 4. Such configurations permit the incorporation of intelligent control for balance and harmonization of the luminance and chromaticity across different modules and different panels.

Moreover, each modular design—including IDPM, IAPM and IHDPM configurations—may comprise digital control and digital communication capability or circuits (for example, as shown in FIG. 4), for improved system capability of digital control of chromaticity, dimming, balance, and/or harmonization. Implementing such an integrated modular approach can reduce system wiring complexity, weight, the number of cables and connectors, and may therefore reduce design and fabrication costs.

With further reference to FIG. 4, embodiments of three exemplary integrated control panel modules 50A, 50B, 50C are interconnected in a hybrid-digital CCP system 60 with hybrid interface technologies generally illustrated. As illustrated, from a digital perspective, an external bus 70 (e.g., bidirectional digital communication bus) can be provided between the CCP system 50A, and aircraft load groups 80 and an operational control computer system 90 (e.g., a flight desk computer system or a system computer). As logic drive unit (LDU) 100 may be embedded with one of the IMCCP modules of the CCP system (e.g., module 50A) to digitally communicate with the aircraft system and load groups. If desired, CCP system status and/or feedback data can also be transferred to the operational control computer system 90 (e.g., flight desk computer system). In the illustrated embodiment in FIG. 4, the LDU 100 is shown residing in an integrated hybrid digital panel module (IHDPM) 50A. The LDU 100 may, however, be incorporated with the system 60 in various other manners as would be known to those of skill in the art. The associated LDU (e.g., LDU 100) may be configured to extract control variables and/or messages from a communication protocol format (e.g., associated with an external bus 70) to logical control variables. It is noted that CCP system status and/or feedback data can also be transferred to an operational control computer system (e.g., a flight desk computer or system computer). The integrated capability of digital communication buses that may be employed include, for example, AFDX664/ARINC664, ARINC 825 and alternative aviation digital communications.

Additionally, an internal digital communication bus 110 may be provided between the IMCCP modules of the CCP system, including IHDPM, IDPM, and IAPM modules, to exchange data between the modules. Without limitation, in the exemplary embodiment shown in FIG. 4, an internal digital communication bus 110 is provided between IHDPM module 50A and IAPM module 50B. Further, if desired, interconnecting nodes of an internal digital communication bus may form a ring or star configuration, for example, interconnecting modules of IHDPM 50A, IAPM 50B and IDPM 50C.

With continued reference to FIG. 4, it is noted that external digital communication may, for example, involve AFDX or the like; and internal digital communication may, for example, involve CAN, RS 485, etc. Additionally, the DSP and a digitally controlled power circuit (DCPC) may be physically separated. Also, several power inputs 120 are shown in connection with the included modules 50A-50C. Such power inputs may, for example, comprise 28 volt main and 28 volt standby inputs.

Figure 5:
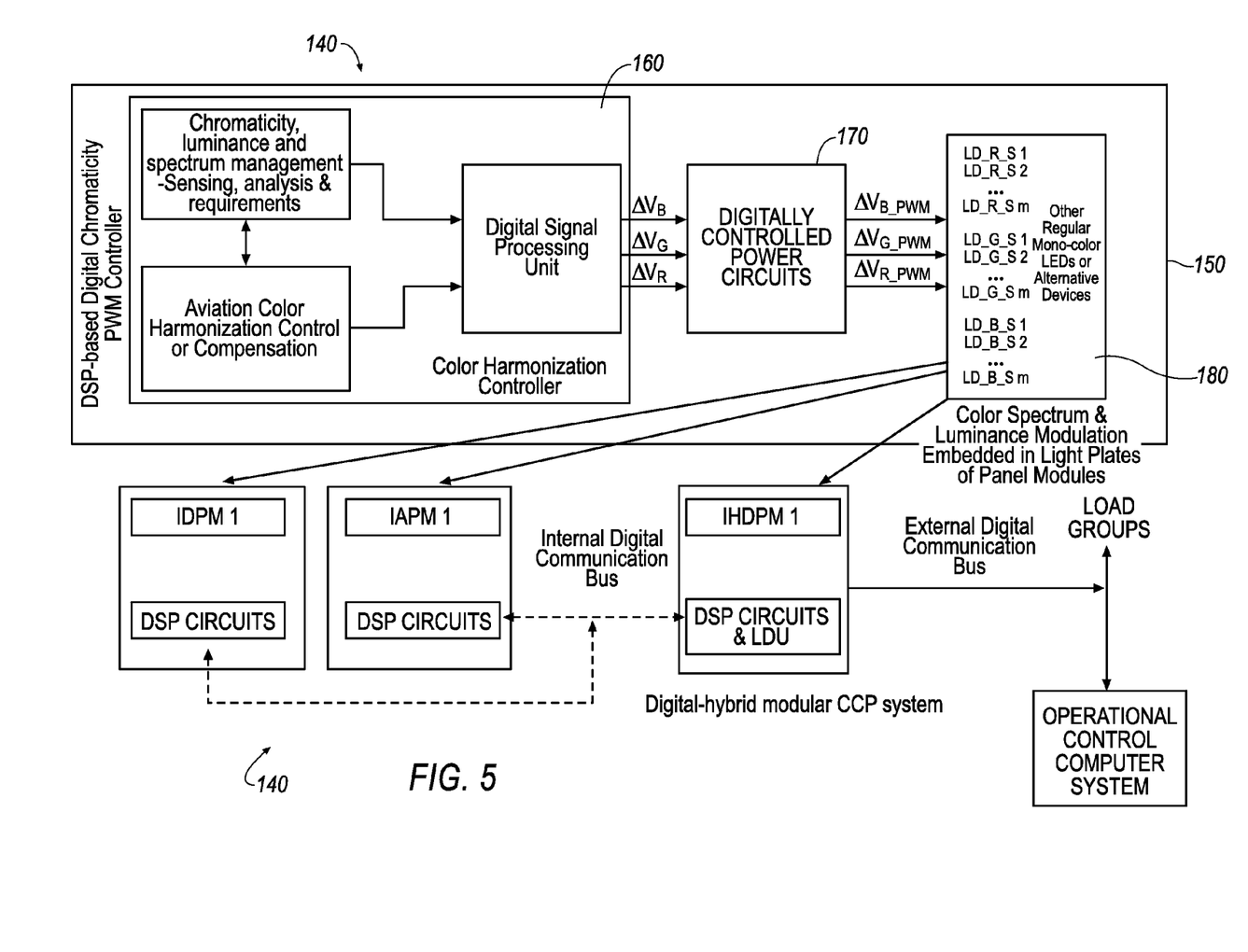
FIG. 5 generally illustrates an embodiment of a system configuration for in-module chromaticity modulation and control, including cross-module coordination.

FIG. 5 generally illustrates a system 140 configured for in-module chromaticity modulation and control, as well as cross-module coordination, according to an embodiment of the invention. The system 140 includes a chromaticity controller 150 (e.g., a DSP-based digital chromaticity pulse-width modulation (PWM) controller) that, in turn, may include a color harmonization controller 160. As generally shown, the chromaticity controller 150 may include in-module and cross-module luminance control, color management, modulation and compensation for balance and harmonization of multiple panel modules.

The digital chromaticity control approach, according to an embodiment of the present invention, may be employed for, among other things, dimming, color (spectrum) balance, and harmonization. Such systems may include several components/features, which are described hereinafter in further detail:

(1) A digital controller for color compensation, balance, and harmonization. The digital controller may be configured to, inter alia:
provide color spectrum management, including checking/sensing, analyzing and producing guidelines for light control,
provide digital color harmonization control and/or compensation, and/or
provide a dedicated digital signal processing unit, including hardware and software, to provide digital control reference signals for the color spectrum injections/compensation.

(2) A digital control methodology and power circuit for color spectrum injection/compensation. Such color spectrum adjustment/injection/compensation may, for example, be accomplished by employing the following systematic control methodology—in which three single visible light sources/devices provide light in the following spectrum bands: 450-475 nm in wavelength (color 1-B); 495-570 nm in wavelength (color 2-G); and 620-750 nm in wavelength (color 3-R). In FIG. 5, LD_B_S represents illumination in the color 1-B spectrum, LD_G_S represents illumination in the color 2-G spectrum, and LD_R_S represents illumination in the color 3-R spectrum. The associated steps may include:

(a) producing a desirable amount of light flux of each light component above by a digital modulation; the digital modulation may be achieved by pulse-width modulation, for example, by controlling the average voltage as applied to the light device producing single-visible light sources, respectively—this is for a first light-spectra modulation by changing the ratio of the light flux of the three visible light sources;

(b) distributing the desirable amount of light flux of each of three light components above by a proper geophysical distribution/layout for a second light-spectrum modulation; and (c) incorporating the digital modulation in an integrated DSP controller or microcontroller circuit (MPU) including, without limitation, a TMS320C2812 MPU.

(3) In an integrated CCP module, a color spectrums distributor that is configured for assisting the spectrum may be embedded in the light plates of a panel module.

(4) A light flux control at a specific color, or dimming control, may be facilitated by maintaining the ratio of the three components substantially constant, but adjusting the PWM modulation index synchronously from a small to high level (for example, 0.01% to 100%) synchronously. This can provide a means for digital luminance control or digital dimming control.

(5) The color harmonization and luminance of all hardware modules, including IHDPM, IDPM and IAPM, may be controlled by a digital harmonization controller, such as the controller 160 shown in FIG. 5.

It is noted that the drawings are intended to illustrate various concepts associated with the disclosure and are not intended to so narrowly limit the invention. Again, the present concept includes, inter alia, a system and digital approach for color (spectrum) harmonization and balance. As shown, embodiments of the system may include a digital color harmonization controller that provides display color spectrum management, including checking/sensing, analyzing and producing guidelines for light control. The digital color harmonization controller may also be configured to provide digital color harmonization control and/or compensation; and a dedicated digital signal processing unit, including hardware and software, may provide digital control reference signals for color spectrum injection and compensation.

In embodiments, the system references for chromaticity and luminance control and spectrum management can be generated off-line per pre-defined requirements at a system level. The system may also include a digitally controlled power circuit (e.g., digitally controlled power circuits 170) for the color spectrum injection and compensation.

Figure 6:
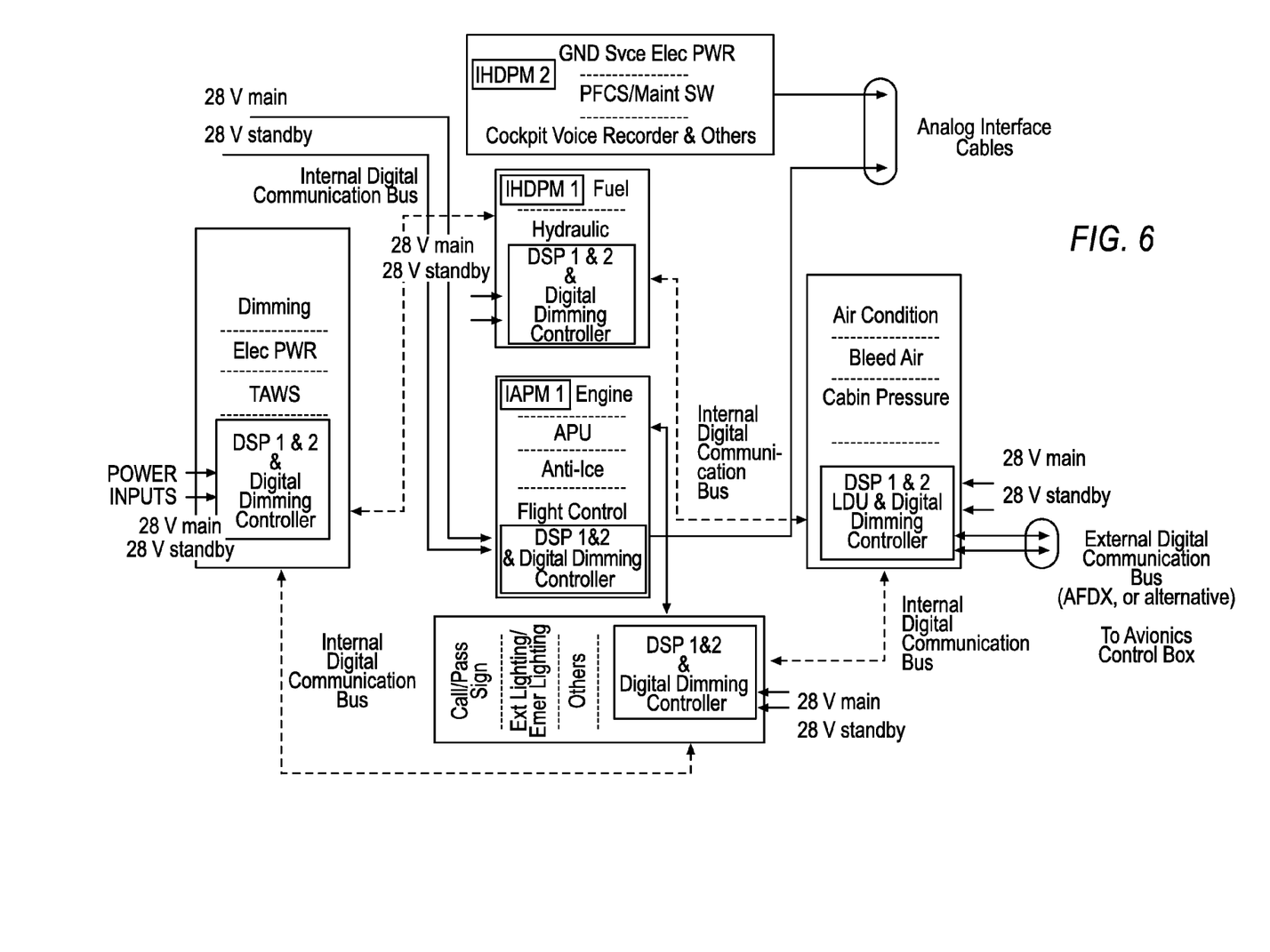
FIG. 6 generally illustrates an embodiment of a simplified exemplary zonal CCP configuration employing an integrated modular approach.

FIG. 6 depicts a zonal CCP configuration employing an integrated modular approach for multiple CCP panels. With reference to the embodiment shown in FIG. 6, it is noted that the DSP and dimming controller may be on the same or a separated PCB.

In an embodiment of the invention, the color spectrum injection and compensation are accomplished by modulation of the three fundamental color spectrums (light flux) in red, green, and blue. In applications, such a modulation may be accomplished by a two-stage process. The first stage may involve a digital pulse-width modulation to provide the proper amount of light flux in specific spectrums. The system may also include a second-stage light processing that employs a color spectrums distributor (e.g., color spectrum and luminance modulation distributor 180) for assisting the spectrum and luminance modulation embedded in the light plates of the panel modules. Such an embodiment is different from a conventional color mixer in LCD panels.

FIG. 7 generally illustrates an embodiment of a simplified exemplary light source distributor map for in-module chromaticity control and spectrum modulation through space distribution and reflection.

Figure 7A:
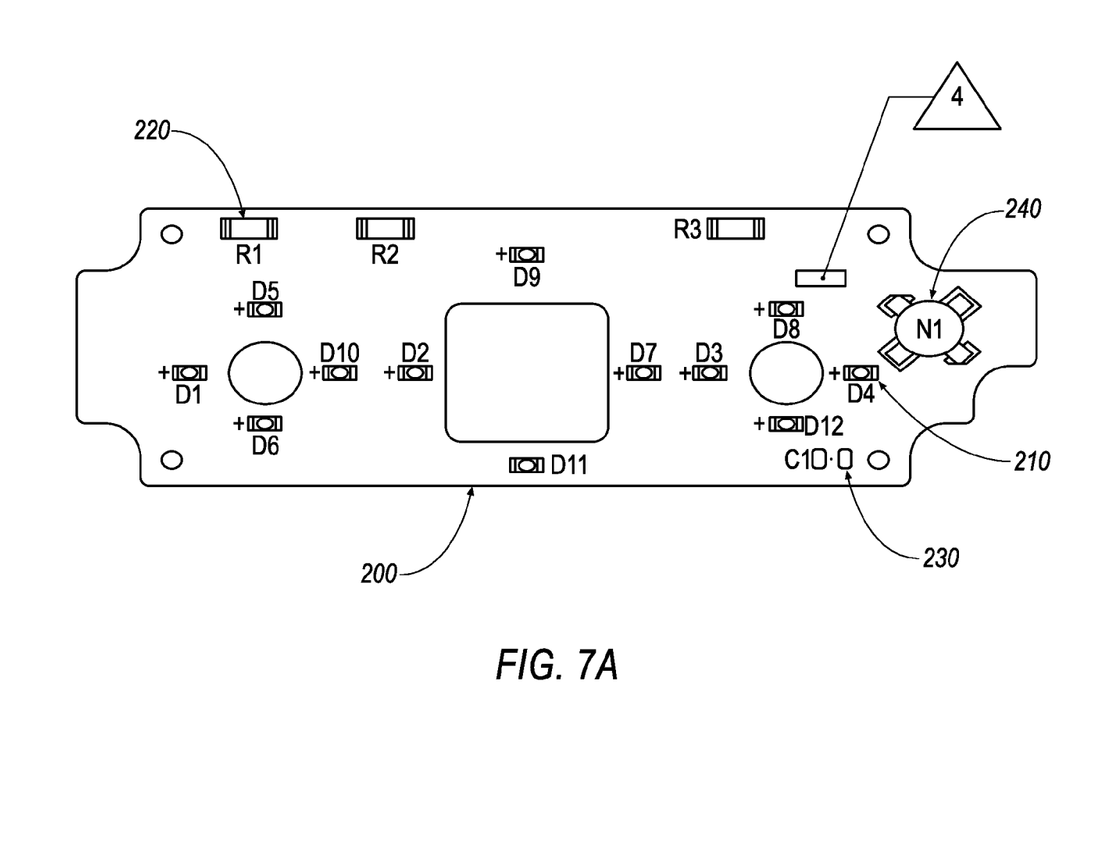
FIG. 7A generally illustrates an embodiment of an exemplary light source distributor map for in-module chromaticity control and spectrum modulation through space distribution and reflection.
Figure 7B:
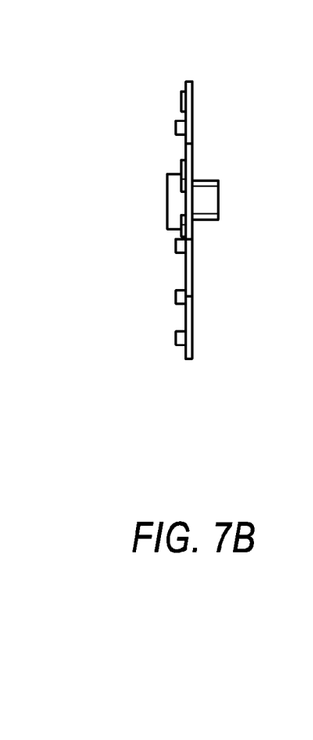
FIG. 7B generally represents a side view of the component illustrated in FIG. 7A.

FIG. 7A generally illustrates an embodiment of an exemplary light source distributor map for in-module chromaticity control and spectrum modulation through space distribution and reflection. The illustrated component includes a PCB 200, light sources 210, film resistors 220, capacitors 230, and may include other electric device(s) 240. The PCB 200 may be conventional or flexible ink-printed. With respect to the light sources 210, each of the devices in group 2, shown as elements D1 to D12, may contain three visible and adjustable light sources having the following spectrum bands: 450-475 nm in wavelength (color 1-B), 495-570 nm in wavelength (color 2-G), and 620-750 nm in wavelength (color 3-R). FIG. 7B generally represents a side view of the component illustrated in FIG. 7A.

Again, with embodiments of the system, both in-module digital control and modulation and cross-module coordinated digital control and modulation may be employed. Further, color harmonization and luminance of all associated hardware modules, including IDPM, IDPM, and IAPM, may be controlled by a digital harmonization controller.

It is to be understood that a wide range of changes and modifications to the embodiments described above will be apparent to those skilled in the art, and are contemplated. It is therefore intended that the foregoing detailed description be regarded as illustrative rather than limiting, and that it be understood that it is the following claims, including all equivalents, that are intended to define the spirit and scope of this invention.

What is claimed:

1. A digital hybrid cockpit control panel system with coordinated digital chromaticity control, comprising:
   a system architecture including a plurality of integrated modular control panels, each integrated modular control panel including:
   a digital chromaticity controller configured to provide both in-module and cross-module chromaticity modulation and control;
   a printed circuit board including a digital processing function and digital communication;
   a panel front face plate;
   a digitally controlled power supply or power assembly.

2. The system of claim 1, wherein the system includes at least two different types of integrated modular control panels selected from the group consisting of IHDPM, IDPM, and IAPM panels.

3. The system of claim 1, wherein the printed circuit board is an integrated board that includes analog/discrete signal interfacing, A/D, a digital signal processor or microprocessor, and a digital communication circuit.

4. The system of claim 1, wherein the panel front face plate includes a light plate configured to illuminate a control panel for interfacing with a user or pilot.

5. The system of claim 1, wherein at least two integrated modular control panels are interconnected by an internal digital communication bus.

6. The system of claim 1, including an external bus providing operational connection between the system and an external load group or computer system.

7. The system of claim 1, wherein at least one integrated modular control panel includes a logic drive unit.

8. The system of claim 1, wherein the system includes an integrated hybrid-digital panel module comprising a combination of digital and analog interfaced control panels.

9. The system of claim 1, wherein the system includes an integrated digital panel module that receives discrete or analog inputs from operating devices of the front panels.

10. The system of claim 9, wherein the system is configured to processes the discrete or analog inputs in an embedded digital signal processor circuit, and to provide control outputs via a digital serial communication bus.

11. The system of claim 10, wherein the system is configured to record or register the discrete or analog inputs.

12. The system of claim 1, wherein the system includes an integrated analog panel module comprising analog interfaces for inputs and outputs.

13. The system of claim 12, wherein the system is configured to receive a discrete or analog input from an operating device associated with one or more front panels, and to record or register the input in an embedded circuit, wherein the recorded or registered input is used for status monitoring or feedback.

14. The system of claim 1, wherein the panel front face plate for two or more individual panel functions or panel portions within an individual integrated modular control panel are provided in a single integrated assembly.

15. The system of claim 1, wherein the panel front face plate for two or more individual panel functions or panel portions within an individual integrated modular control panel are provided in a separated sections of the individual integrated modular control panel.

16. The system of claim 14, wherein the single integrated assembly includes an integrated light plate.

17. The system of claim 1, wherein a single mounting plate is configured to provide mechanical or mounting supports for the integrated modular control panel.

18. The system of claim 1, wherein the digital chromaticity controller controls one or more of the integrated modular control panels for color balance, luminance, color compensation, and color harmonization.

19. The system of claim 1, including a zonal or local dimming control sub-panel or sub-controller.

20. The system of claim 19, wherein the dimming control sub-panel or sub-controller is configured to permit setting and coordinating of dimming control for a plurality of control zones.

21. The system of claim 1, wherein the digital chromaticity controller includes a color harmonization controller configured to provide color spectrum control.

22. The system of claim 21, wherein the digital chromaticity controller includes a digitally controlled power circuit; the digitally controlled power circuit configured to provide color spectrum injection and compensation.

23. The system of claim 1, wherein the digital chromaticity controller includes a color spectrum distributor configured to assist with the spectrum and luminance modulation for a plurality of the integrated modular control panels.

24. The system of claim 23, wherein a panel front face plate includes a light plate, and the color spectrum distributor is embedded in the light plate.

25. The system of claim 1, wherein the system is configured to provide digital modulation by providing pulse-width modulation for controlling an average voltage applied to visible light sources.

26. The system of claim 25, wherein digital luminance control or digital dimming control at a specific color is produced by maintaining the ratio of three visible light components constant and adjusting a modulation index synchronously.

27. The system of claim 1, wherein an external bidirectional digital communication bus is provided between the system and an aircraft load group or a system computer for control interfacing and status feedback at system level.

28. The system of claim 1, including interconnecting nodes of an internal digital communication bus that form a ring or star configuration connecting integrated modular control panels.

* * * * *